(12) United States Patent
Wheeler

(10) Patent No.: US 7,120,797 B2
(45) Date of Patent: Oct. 10, 2006

(54) METHODS FOR AUTHENTICATING POTENTIAL MEMBERS INVITED TO JOIN A GROUP

(75) Inventor: Graham A. Wheeler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 10/132,018

(22) Filed: Apr. 24, 2002

(65) Prior Publication Data

US 2003/0204734 A1    Oct. 30, 2003

(51) Int. Cl.
  H04L 9/00     (2006.01)
  H04K 1/00     (2006.01)

(52) U.S. Cl. .................... 713/176; 713/182; 380/44; 380/277

(58) Field of Classification Search .............. None
  See application file for complete search history.

(56) References Cited

U.S. PATENT DOCUMENTS

| | | | |
|---|---|---|---|
| 4,200,770 A * | 4/1980 | Hellman et al. ............ 380/30 |
| 5,706,349 A | 1/1998 | Aditham et al. | |
| 5,953,420 A | 9/1999 | Matyas, Jr. et al. | |
| 6,226,383 B1 * | 5/2001 | Jablon .................... 380/30 |
| 6,230,269 B1 | 5/2001 | Spies et al. | |
| 6,292,896 B1 | 9/2001 | Guski et al. | |
| 6,336,188 B1 * | 1/2002 | Blake-Wilson et al. ..... 713/171 |
| 6,377,691 B1 | 4/2002 | Swift et al. | |
| 6,539,479 B1 * | 3/2003 | Wu ...................... 713/151 |
| 6,986,046 B1 * | 1/2006 | Tuvell et al. ............. 713/171 |
| 2002/0067832 A1 * | 6/2002 | Jablon .................... 380/277 |

FOREIGN PATENT DOCUMENTS

EP    1 102 430 A1    5/2001

OTHER PUBLICATIONS

Gong, "Enclaves: Enabling Secure Collaboration over the Internet", Jul. 1996, Proceedings of the Sixth USENIX Security Symposium, p. 1-12.*
Jablon, "Strong Password-Only Authenticated Key Exchange", Sep. 25, 1996, ACM Computer Communication Review, p. 1-23.*
Zhou et al.: "Securing Ad Hoc Networks," IEEE Network (Nov./Dec. 1999), pp. 24-30.

* cited by examiner

Primary Examiner—Christopher Revak
(74) Attorney, Agent, or Firm—Marshall, Gerstein & Borun LLP

(57) ABSTRACT

Disclosed are methods for an invitee to gain admittance to a group. An inviter already in the group and the invitee share a secret password. The inviter uses the password to create an invitation and then issues the invitation to the invitee and to an authenticator. The authenticator creates a challenge key and challenge value and sends the challenge value to the invitee. Using the password and information from the invitation, the invitee recreates the challenge key, uses the challenge key to derive a response value from the challenge value, and sends the response value to the authenticator. The authenticator compares the response value with an expected value and, if they match, knows that the invitee must have been able to recreate the challenge key. The authenticator trusts that this invitee must be the one for which the inviter issued the invitation and admits the invitee to the group.

44 Claims, 9 Drawing Sheets

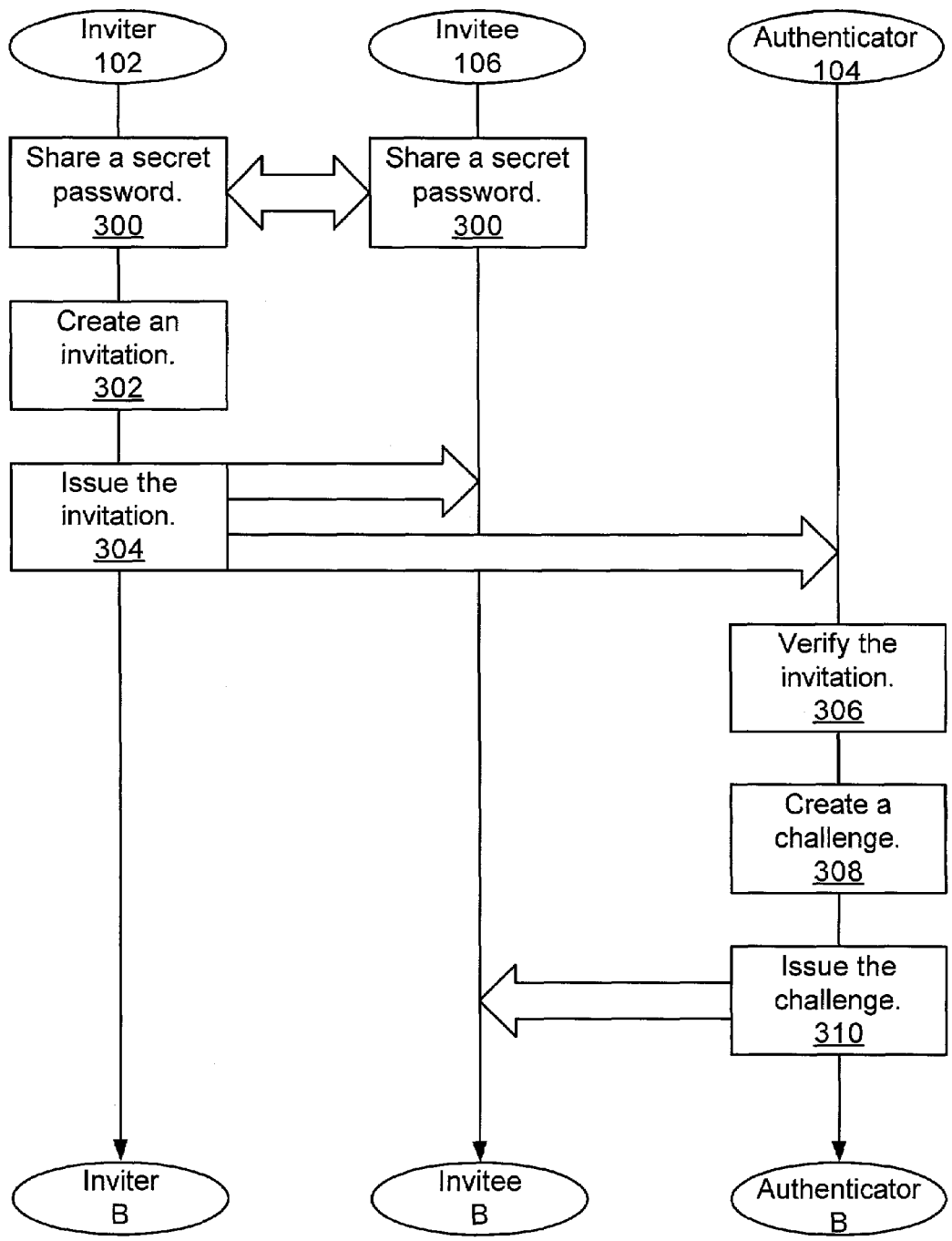

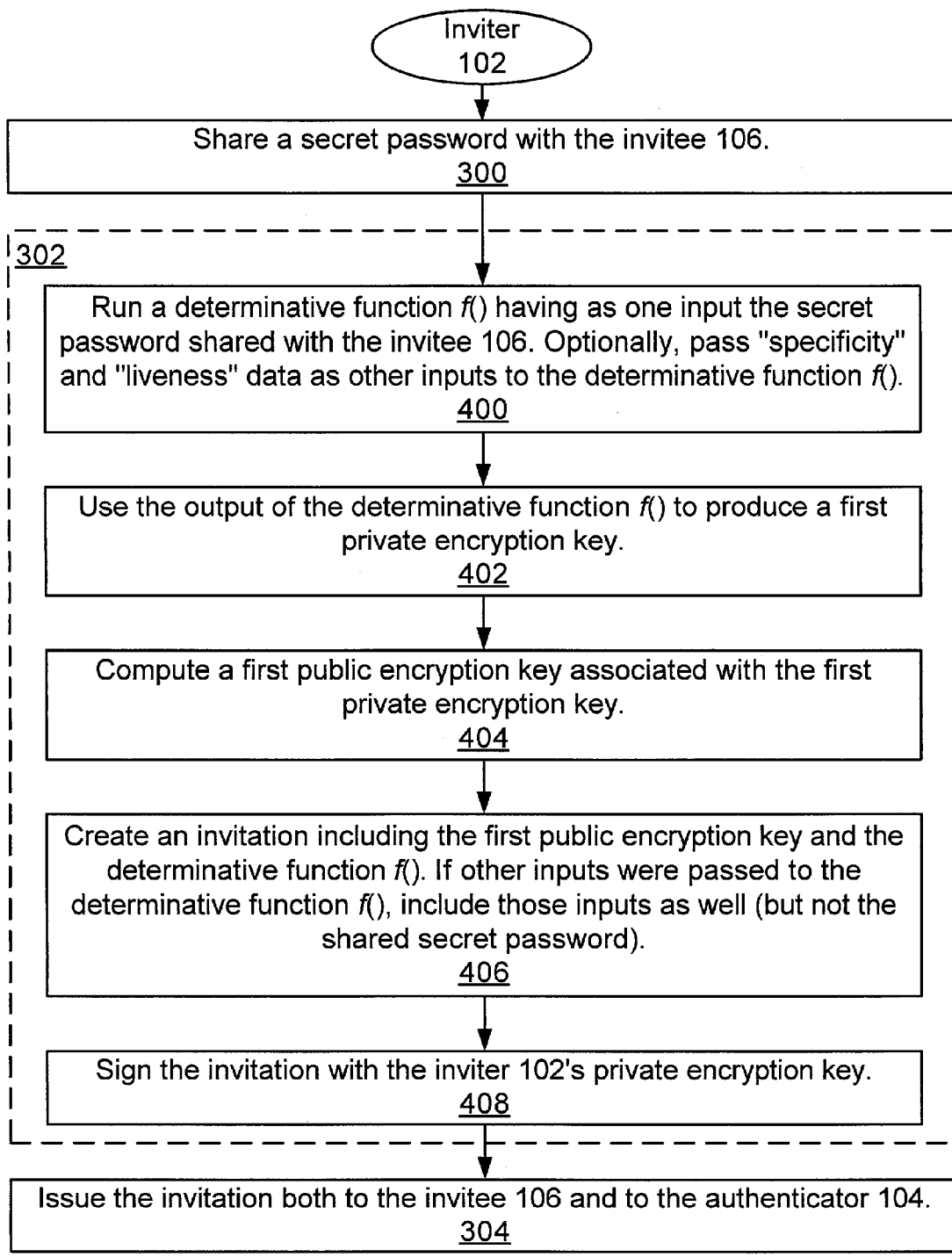

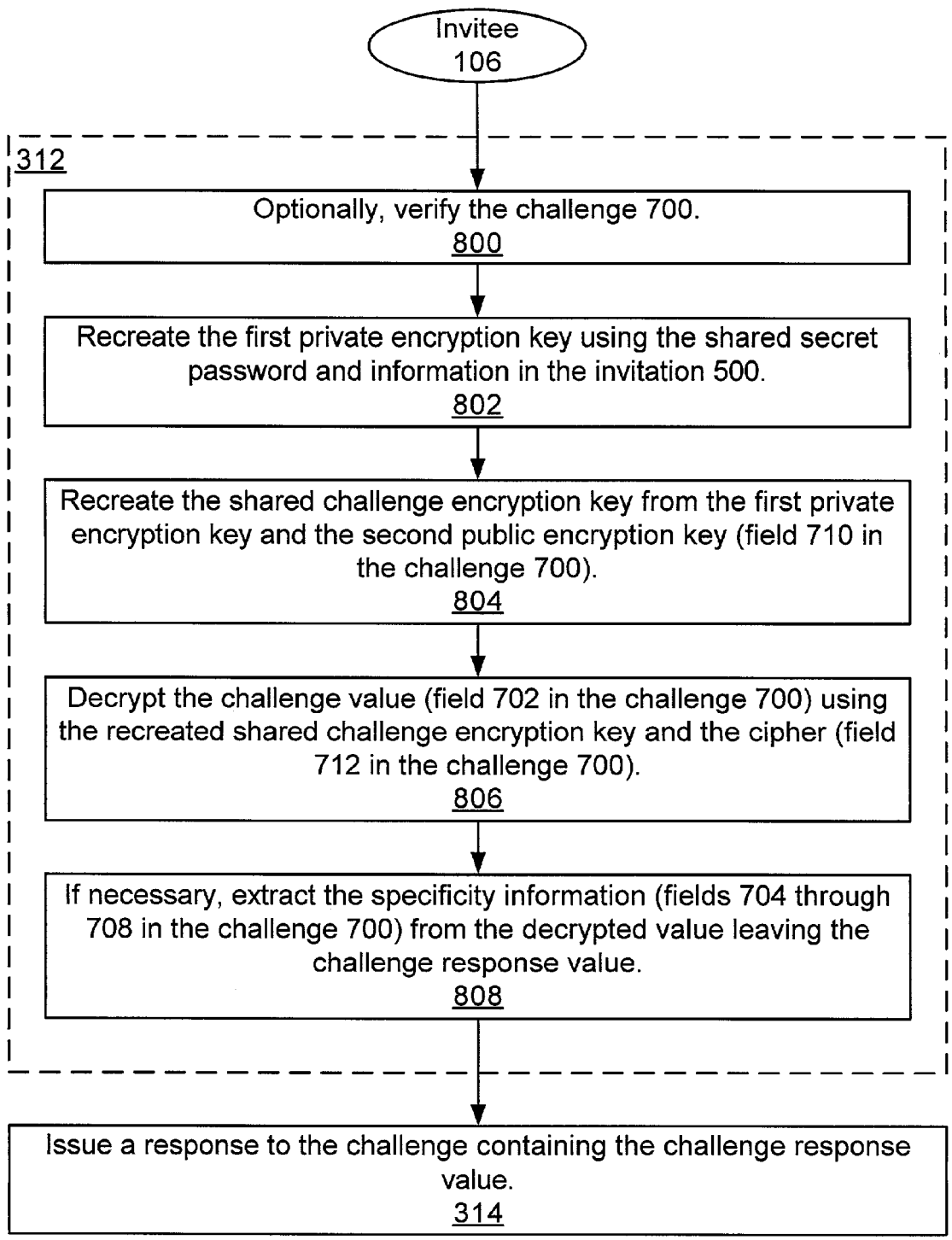

METHODS FOR AUTHENTICATING POTENTIAL MEMBERS INVITED TO JOIN A GROUP

TECHNICAL FIELD

The present invention is related generally to computer communications, and, more particularly, to authenticating potential members invited to join a network group.

BACKGROUND OF THE INVENTION

In an "ad hoc" computer group, each computer directly talks to and shares computing resources and services with other computers in the group. This type of group allows the collective computing power of all members to benefit the entire group. For example, a large computational job calling for significant computational power and resources can be distributed across multiple members of the group, and computation results can be shared directly among the members of the group. Moreover, this type of group allows new members to join the group that never connected to the group before.

For managing and supporting the ad hoc group, each computer takes one of three basic roles, the roles defined by privileges to interact in given ways with other group members. The three basic roles are owner, inviter, and authenticator. The owner establishes the group and has all the privileges defined in the group including the privilege to invite a new member to join the group, the privilege to authenticate a new member and thus to admit the new member to the group, the privilege to change the role of a member, and the privilege to change information about the group. An inviter has the same privileges as the owner except for the privilege to change group information. An authenticator may authenticate a new member into the group, but does not have the privilege to invite the new member to join the group.

Security is one of the major concerns in an ad hoc group. In order to keep the group secure, a new potential member, when trying to join the group, exchanges authentication proofs with an authenticator in the group. This authentication process is repeated by the new group member with every group member with whom the new group member wishes to directly converse. (A first group member may indirectly converse with a second member with whom it has not been authenticated by passing information through a third member with whom the first and second members have been authenticated. This indirect communications method is always available, but does not affect the discussion of the present invention and will not be mentioned again.) Unlike groups with a fixed membership, in an ad hoc group new members may ask to join the group at any time. It is almost impossible for an authenticator in the group to maintain authentication information for all potential members of the group.

Making authentication in an ad hoc group even more of a problem, the new potential member may wish to converse with an authenticator that does not have the privilege necessary to invite the new member to join the group. For example, Alice intends to join an ad hoc group in order to converse with authenticator Bob. Trent is an inviter in the group. Alice gets an invitation to join the group from Trent, but she now wants to be authenticated by Bob in order to converse with him. While Trent trusts Alice (else he would not have invited her to join the group), and while Bob trusts Trent and trusts the invitation Trent gave to Alice, Bob knows nothing about Alice and, hence, does not trust her. Before allowing Alice to join the group, Bob needs to transfer some of his trust for Trent to Alice.

What is needed is a mechanism for an authenticator in a group to securely transfer its trust of an established inviter in the group to a potential group member.

SUMMARY OF THE INVENTION

In view of the foregoing, the present invention provides methods for a computer (the invitee), having established a relationship of trust with an inviter in a group and having been invited to join the group by the inviter, to leverage that relationship of trust in order to be authenticated into the group by an authenticator.

The inviter and the invitee share a secret password, presumed to be known by no one else. The inviter creates a first public/private encryption key pair by running a determinative function with the shared secret password as input. (Other inputs to the function may include a timestamp and identifiers of the inviter, the invitee, and the group.) Then the inviter issues an invitation for the invitee. The invitation includes the public encryption key from the first public/private encryption key pair along with the other inputs to the determinative function except for the shared secret password. Using standard cryptographic techniques, the inviter signs the invitation with the inviter's private encryption key. (Note: The inviter's private encryption key is not related to the first public/private encryption key pair that the inviter just generated.) The invitation is made known to both the invitee and to an authenticator in the group.

To confirm that the invitation was issued by an inviter in the group, the authenticator, which knows the public encryption keys of all inviters in the group, verifies the inviter's signature. If the invitation is valid, the authenticator attempts to authenticate the identity of the invitee. The authenticator creates a second public/private encryption key pair. Applying the well known Diffie-Hellman (DH) theory, the authenticator creates a shared challenge encryption key from the public encryption key of the first public/private encryption key pair and the private encryption key of the second public/private encryption key pair. To test whether the invitee can recreate this shared challenge encryption key, the authenticator generates a challenge value and an expected challenge response value. The challenge value and the expected challenge response value are linked together by an implementation-dependent operation involving the shared challenge encryption key. The authenticator delivers the challenge value to the invitee along with the second public encryption key.

Upon reception of the challenge, the invitee mimics the procedure followed by the inviter. Using the contents of the invitation and the invitee's knowledge of the secret password it shares with the inviter, the invitee recreates the first private encryption key created by the inviter. Applying DH theory, the invitee next recreates the shared challenge encryption key from the recreated private encryption key of the first public/private encryption key pair and the public encryption key of the second public/private encryption key pair. Once the shared challenge encryption key is recreated, the invitee uses the shared challenge encryption key to perform an implementation-dependent operation upon the received challenge value. The invitee then sends the result of the operation as a challenge response value back to the authenticator.

The authenticator compares the challenge response value received from the invitee with its own expected challenge response value. If they match, the authenticator trusts that this invitee must be the one for which the inviter issued the invitation. No third party knows the secret shared password so no third party could have correctly recreated the shared challenge encryption key and performed the operation necessary to derive the challenge response value from the challenge value. The authenticator then admits the invitee into the group.

Thus, the trust between the inviter and the invitee, as represented by their shared secret password, becomes the basis for establishing trust between the invitee and the authenticator. As an optional feature, the authenticator authenticates itself to the invitee to complete a mutual authentication process.

The invitee, now a group member, may reuse the invitation to authenticate itself to other members of the group. (The inviter may limit this ability by marking the invitation as usable only once or by putting a time limit on its use.)

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a and 3b together form a dataflow diagram showing the messages passed and the operations performed when admitting an invitee into an ad hoc group according to one aspect of the present invention;

FIG. 4 is flow chart illustrating an exemplary method performed by an inviter when issuing an invitation;

FIG. 8 is a flow chart illustrating an exemplary method performed by an invitee when responding to a challenge.

DETAILED DESCRIPTION OF THE INVENTION

Figure 1:
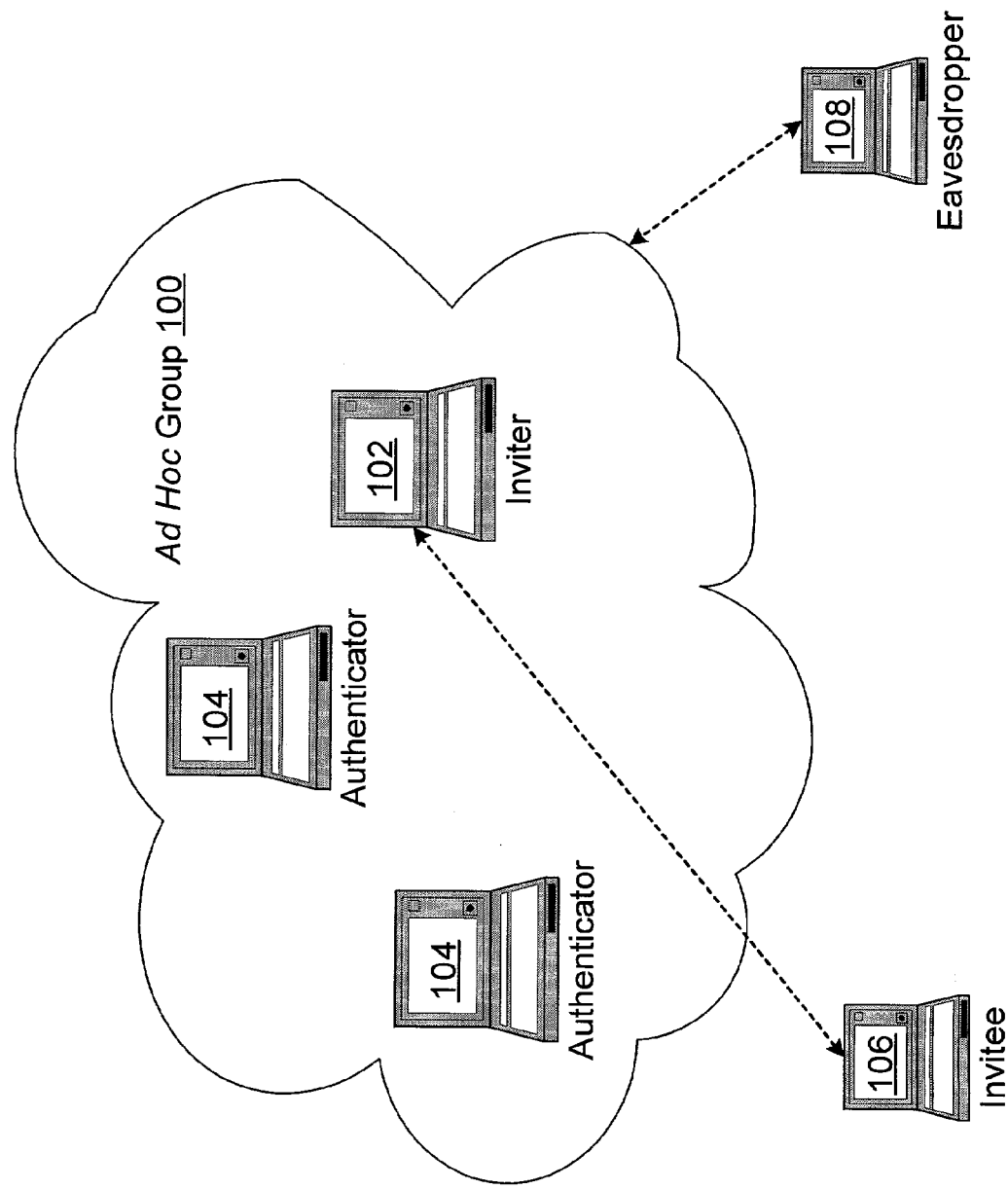
FIG. 1 is a block diagram showing an exemplary ad hoc group containing an inviter and a couple of authenticators and, outside of the group, an invitee and an eavesdropper.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention provides a method for authenticating potential members invited to join an ad hoc group of computing devices. In FIG. 1, the current members of an ad hoc group 100 include an inviter 102 and authenticators 104. The inviter 102 is in communication with a device currently outside of the ad hoc group 100, computing device 106 (the invitee). The inviter 102 and the invitee 106 trust each other, as expressed by a secret password they share. Based on that trust, the inviter 102 invites the invitee 106 to join the group 100. However, the invitee 106 wishes to join the group 100 not to communicate with the inviter 102, but rather to communicate with one of the authenticators 104. While an authenticator 104 can authenticate the invitee 106 once the invitee 106 has been invited to join the group 100, the authenticator 104 does not have the necessary privilege to invite the invitee 106 to join. The authenticator 104 has no reason to trust the invitee 106. The present invention provides a method whereby the inviter 102' trust of the invitee 106 is transferred to an authenticator 104. Now trusting the invitee 106, the authenticator 104 allows it into the group 100.

The communications of many ad hoc groups are subject to interception by malicious eavesdroppers. Groups using wireless communication technologies are especially susceptible to eavesdropping. If an eavesdropper 108 were to intercept information passed around during the authentication of the invitee 106, it is conceivable that the eavesdropper 108 could use that information to gain admittance to the ad hoc group 100. The methods of the present invention are designed to provide security to the group 100 even if all authentication information (with the sole exception of the secret password shared between the inviter 102 and the invitee 106) is open to the eavesdropper 108. The methods also protect the security of the secret password because the authenticator 104 never needs to know that password.

Figure 2:
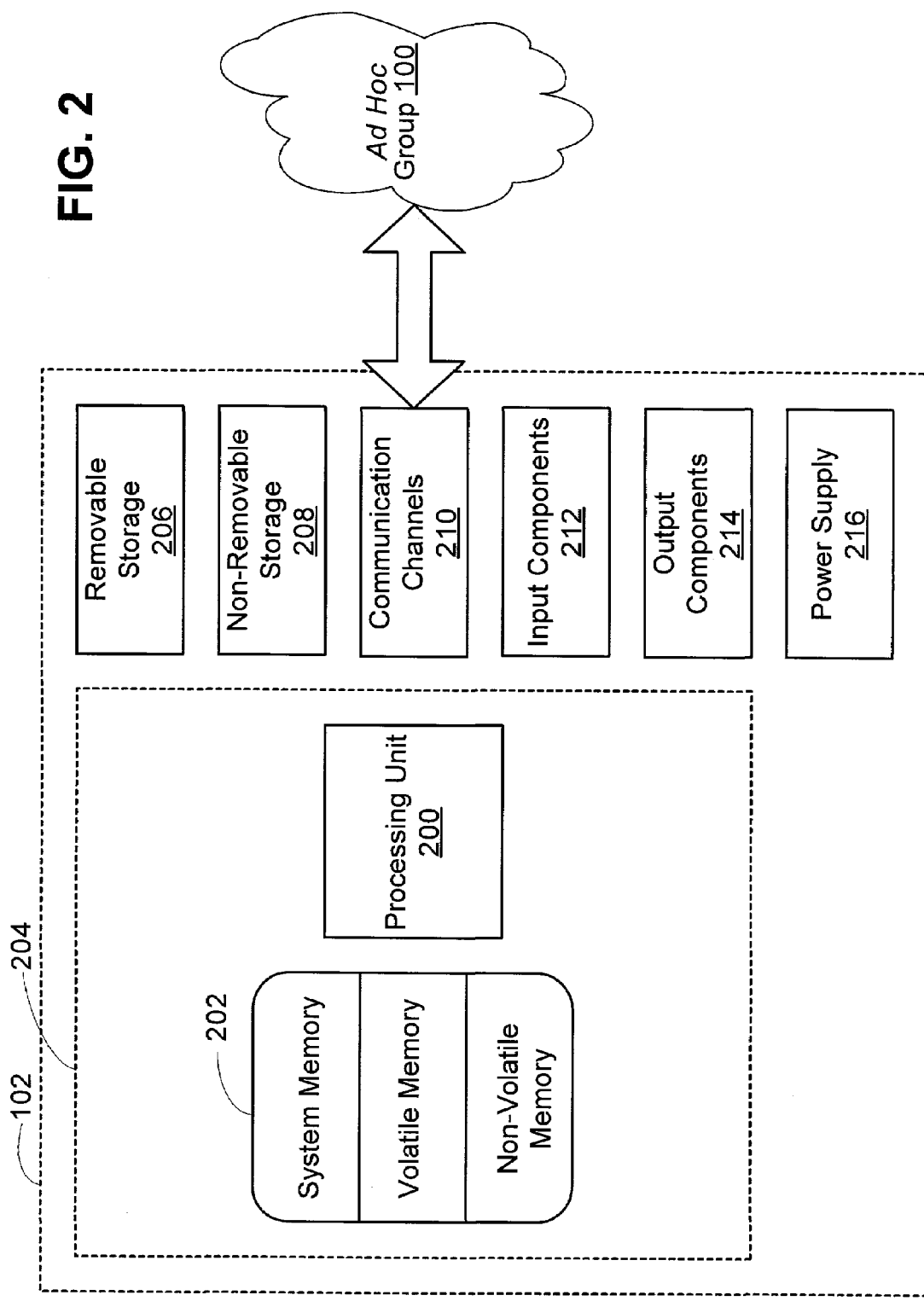
FIG. 2 is a schematic diagram generally illustrating an exemplary computer system that supports the present invention.

The inviter 102, the authenticators 104, and the invitee 106 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 102 may have additional features and functionality. For example, the computing device 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 102. Any such computer-storage media may be part of device 102. Device 102 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 212 such as a keyboard, mouse, pen, voice-input device, touch-input device, etc. Output devices 214 such as a display, speakers, and printer may also be included. All these devices are well know in the art and need not be discussed at length here.

Figure 3B:
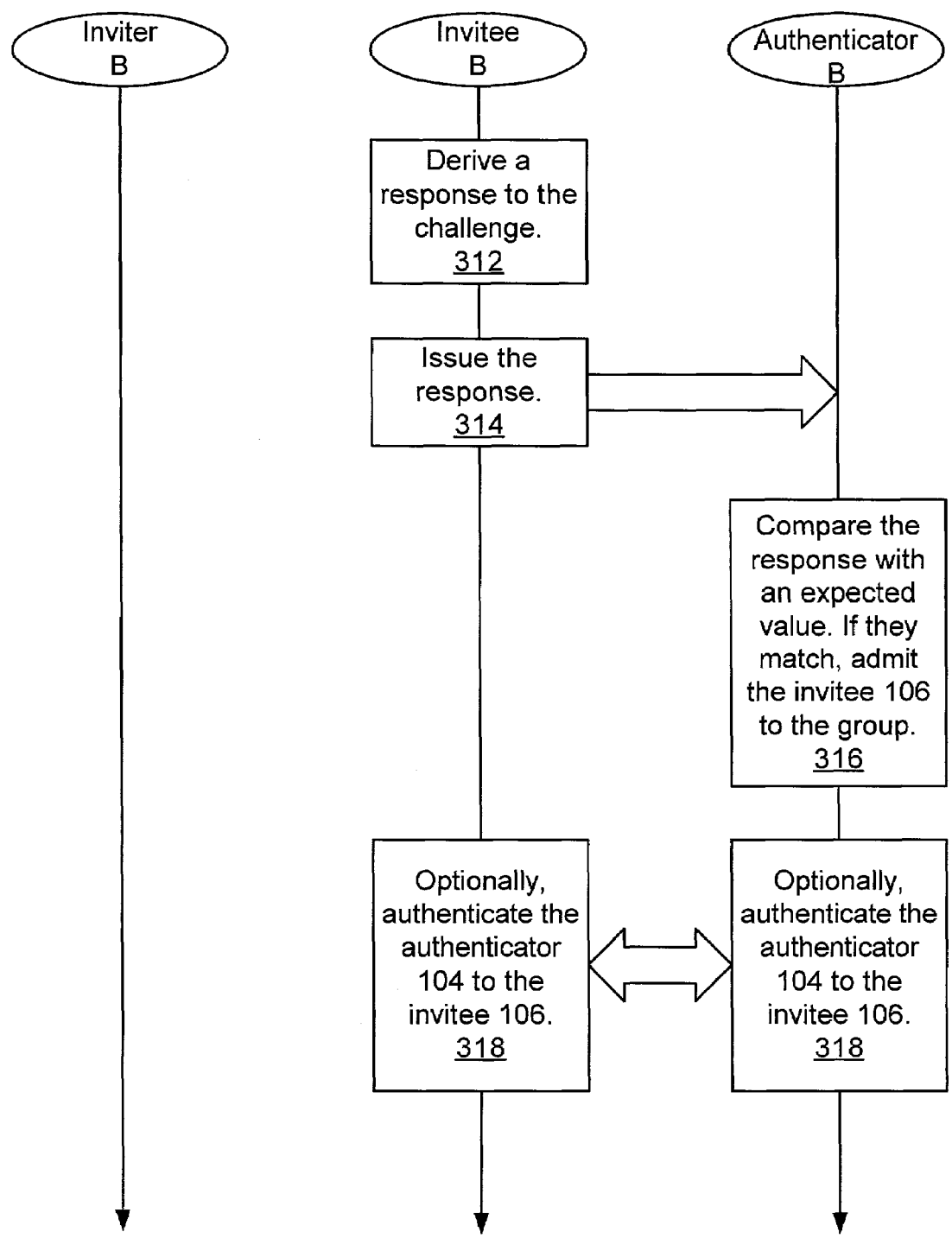

FIGS. 3a and 3b show the messages passed and the operations performed by the inviter 102, invitee 106, and an authenticator 104 during authentication of the invitee 106 according to one aspect of the present invention. The discussion accompanying these two Figures presents an overview of one embodiment of the invention. Further details are presented below in reference to FIGS. 4 through 8. In FIGS. 3a and 3b, time flows downward and from one Figure to the next.

This embodiment of the present invention begins in step 300 with the inviter 102 and the invitee 106 sharing a secret password, presumed to be known by no one else. Exactly how the password is shared is beyond the scope of the invention, however, security is very important here. If the eavesdropper 108 were to come to know the shared secret password, then the security of the ad hoc group 100 would be compromised.

In step 302, the inviter 102 creates an invitation for the invitee 106. The inviter 102 creates a first public/private encryption key pair by running a determinative function with the shared secret password as input. Other inputs to the determinative function, such as a timestamp and identifiers of the inviter 102, the invitee 106, and the ad hoc group 100, may be used to ensure that the invitation is timely and usable only by the intended parties. Then the inviter 102 creates the invitation which includes the public encryption key from the first public/private encryption key pair along with the other inputs to the determinative function except for the shared secret password. Using standard cryptographic techniques, the inviter 102 signs the invitation with the inviter 102's private encryption key. (Note: The inviter 102's private encryption key is not related to the first public/private encryption key pair that the inviter 102 just generated.) In step 304, the invitation is made known both to the invitee 106 and to the authenticator 104.

In step 306, the authenticator 104 attempts to confirm that the invitation was issued by a member of the ad hoc group 100. The authenticator 104, which knows the public encryption keys of all inviters in the group 100, verifies the inviter 102's signature on the invitation. If the invitation is valid, the authenticator 104 next attempts to authenticate the identity of the invitee 106. To do this, the authenticator 104 begins step 308 by creating a second public/private encryption key pair. Applying the well known Diffie-Hellman (DH) theory, the authenticator 104 then creates a shared challenge encryption key from the public encryption key of the first public/private encryption key pair and the private encryption key of the second public/private encryption key pair. To test whether the invitee 106 can recreate this shared challenge encryption key, the authenticator 104 generates a challenge value and an expected challenge response value. The challenge value and the expected challenge response value are linked together by an implementation-dependent operation involving the shared challenge encryption key. Some examples of this operation are given below in the discussion of FIG. 6. In step 310, the authenticator 104 delivers the challenge value to the invitee 106 along with the second public encryption key.

Upon reception of the challenge, the invitee 106 begins step 312 by mimicking the procedure followed by the inviter 102 in step 302. Using the contents of the invitation and the invitee 106's knowledge of the secret password it shares (step 300) with the inviter 102, the invitee 106 recreates the first private encryption key created by the inviter 102. Applying DH theory, the invitee 106 next recreates the shared challenge encryption key from the recreated private encryption key of the first public/private encryption key pair and the public encryption key of the second public/private encryption key pair. Once the shared challenge encryption key is recreated, the invitee 106 uses the shared challenge encryption key to perform an implementation-dependent operation upon the received challenge value. In step 314, the invitee 106 sends the result of the operation as a challenge response value back to the authenticator 104.

In step 316, the authenticator 104 compares the challenge response value received from the invitee 106 with the expected challenge response value generated by the authenticator 104 in step 308. If they match, the authenticator 104 trusts that this invitee 106 must be the one for which the inviter 102 issued the invitation. This follows because no third party knows the secret shared password so no third party could have correctly recreated the shared challenge encryption key and performed the operation necessary to derive the challenge response value from the challenge value. The authenticator 104 then admits the invitee 106 to the ad hoc group 100.

As an optional feature, the authenticator 104 uses well known techniques in step 318 to authenticate itself to the invitee 106 and thus completes a mutual authentication process. The method of FIGS. 3a and 3b may be repeated when the invitee 106 wishes to authenticate itself to another authenticator 104 (unless the invitation was created to be used only once or has expired).

The flow chart of FIG. 4 provides further details into the inviter 102's work in creating an invitation. In step 300 of FIG. 3a, the inviter 102 and the invitee 106 share a secret password. In steps 400 through 404 of FIG. 4, the inviter 102 creates a first public/private encryption key pair from the shared secret password. Specifically, in step 400, the inviter 102 passes the shared secret password as input to a determinative function $f(\ )$. Many functions may serve as the function $f(\ )$ as long as the functions produce a large number as output and rarely, if ever, produce the same output for two different inputs. One possible function $f(\ )$ that satisfies these two criteria is a cryptographic hash function.

In addition to the shared secret password, the determinative function $f(\ )$ may take other inputs. These other inputs are used by recipients of the invitation to know (1) whether the invitation is being presented by an appropriate party ("specificity" information) and (2) whether the invitation is too old to be trusted ("liveness" information). For (1), the inputs can include identifiers for the ad hoc group 100, inviter 102, and invitee 106. Liveness information is often given in the form of a timestamp indicating when the invitation was issued or as a period during which the invitation is valid (e.g., "best if used by . . . ").

In any case, the output of the determinative function $f(\ )$ is used in step 402 to create a first private encryption key. In one embodiment, the following equation is used:

$$\text{PrivateKey}_1 = f(s, \ldots) \text{modulo } p \quad \text{(equation 1)}$$

where

PrivateKey$_1$ is the first private encryption key, $f(\ )$ is the determinative function, s is the secret password shared between the inviter 102 and the invitee 106, . . . represents the optional liveness and specificity inputs to $f(\ )$, and p is a large prime number (for better security, preferably 512 bits or more).

Then in step 404, the inviter 102 generates a first public encryption key associated with this first private encryption key. In one embodiment, the following well known equation is used:

$$\text{PublicKey}_1 = g^{\text{PrivateKey}_1} \text{modulo } p \quad \text{(equation 2)}$$

where

PublicKey$_1$ is the first public encryption key that corresponds to the first private encryption key PrivateKey$_1$, and g is a generator for the large prime number p (that is, for any natural number x less than p, there exists another number y such that $g^y$ modulo p=x).

Figure 5:
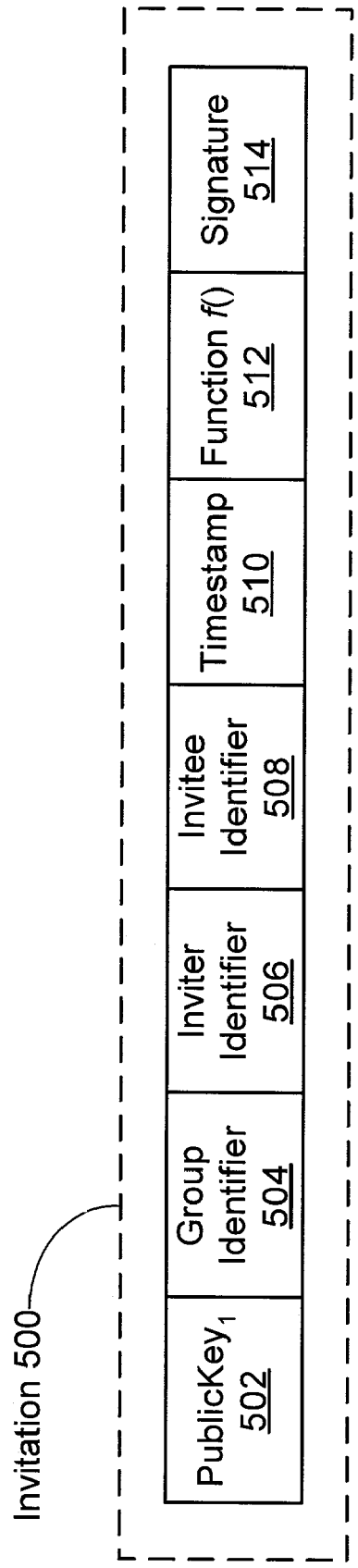
FIG. 5 is a data structure diagram showing the contents of an exemplary invitation according to one aspect of the present invention.

The inviter 102, in step 406, now packages the first public encryption key along with some of the information used to create it into an invitation. FIG. 5 presents an exemplary invitation 500. Along with the first public encryption key field 502, the invitation 500 includes specificity information, that is, information about the intended use of the invitation. Here, the inviter identified in field 506 invited the invitee in field 508 to join the group in field 504. To ensure that the invitation 500 is only usable while it new, the invitation 500 includes liveness information, here a timestamp 510 giving the time that the invitation 500 was issued. The determinative function $f(\ )$ is included in field 512. Note that, in the exemplary invitation 500, when the function $f(\ )$ was used to create the first private encryption key, the inputs to the function $f(\ )$ included specificity information (fields 504 through 508), liveness information (field 510), and the shared secret password. The last is not included in the invitation 500.

The inviter 102 does one more thing before issuing the invitation 500. In step 408, the inviter 102 applies standard cryptographic techniques to sign the invitation 500. To do this, the inviter 102 takes some or all of the information contained in the invitation 500, usually hashes it, and then encrypts the result with the inviter 102's own private encryption key. The encrypted result is the signature that is included in the invitation in field 514. The inviter 102's private encryption key is not known to anyone else. Note that the inviter 102's private encryption key is not related to the first public/private encryption key pair generated in steps 400 through 404.

In step 304, the inviter 102 publishes the invitation 500 so that both the invitee 106 and the authenticator 104 have access to the information in it. It should be noted that there is no requirement that the invitation 500 take the form of a discreet message. The information in the invitation 500 may be published in numerous ways, for example by transmitting a message, by posting in a known accessible spot, or by agreeing on some of the information beforehand. The last case is illustrated by the determinative function $f(\ )$, with its associated prime and generator, which may be a part of the published standards for working with the ad hoc group 100 and thus not need further publication. Note that regardless of which publication means are chosen, the information in the invitation 500 is presumed to be accessible by the eavesdropper 108. The methods of the present invention, as described further below, are designed to prevent the eavesdropper 108 from using this information in order to gain admittance to, and hence to compromise the security of, the group 100.

Figure 6:
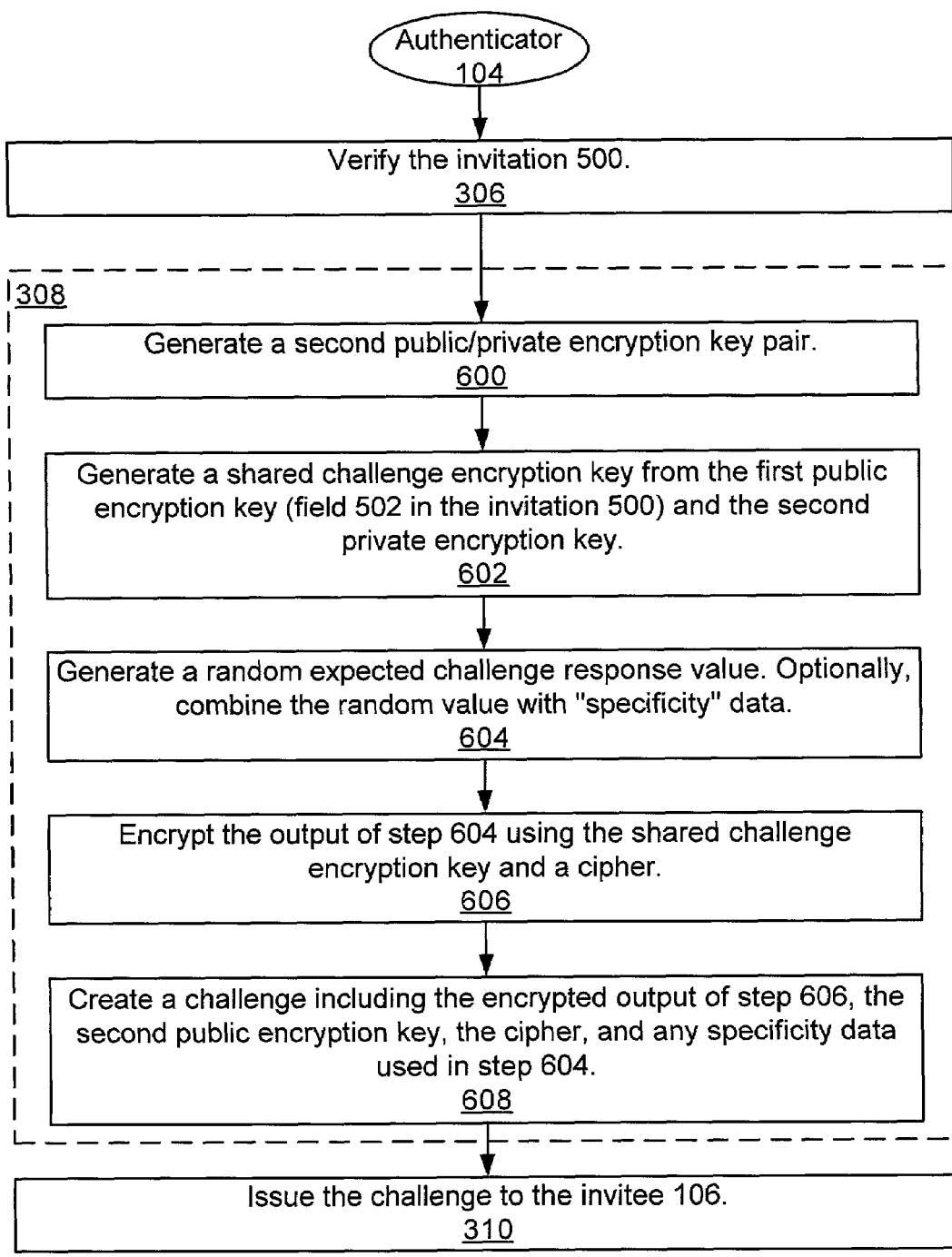
FIG. 6 is a flow chart illustrating an exemplary method performed by an authenticator when verifying an invitation and issuing a challenge to the invitee.

The flow chart of FIG. 6 provides further details into the authenticator 104's work in issuing an authentication challenge in response to the invitation 500. Somehow the authenticator 104 becomes aware of the invitation 500: maybe the invitee 106 or the inviter 102 sent the invitation 500 to the authenticator 104, maybe the authenticator 104 checked an accessible spot known for holding invitations. In any case, the authenticator 104, in step 306, verifies the invitation 500. There are two parts to this verification. First, the authenticator 104 checks the specificity and liveness information, if any, contained in the invitation. In the exemplary invitation 500, the authenticator 104 checks field 504 to make sure that the invitation 500 is being presented for entrance into the proper ad hoc group 100. Field 506 should contain an identifier of an inviter 102 known by the authenticator 104 to be privileged to invite new members to join the group 100. The invitation 500 should be presented to the authenticator 104 by the invitee 106 identified in field 508. Finally, the authenticator 104 checks the timestamp 510 to see if the invitation 500 is still current. If any of these conditions is not met, the authenticator 104 discards the invitation 500 and takes no further action on it.

In the second part of the verification of the invitation 500, the authenticator 104 applies standard cryptographic techniques to verify the signature 514. Specifically, the authenticator 104, which knows the public encryption key of every inviter in the ad hoc group 100, uses the public encryption key of the inviter 102 (as identified in field 506 of the invitation 500) to decrypt the signature 514. (Note again that the inviter 102's public encryption key is not related to the first public encryption key contained in field 502 of the invitation 500.) If the signature was created directly from other information in the invitation 500, then the authenticator 104 compares the decrypted signature with that other information as contained in the fields of the invitation 500. If, as is more likely, the signature 514 was formed from a hash of the information in the invitation 500, then the authenticator 104 recreates the hash from the information in the invitation 500 and compares the resultant hash with the decrypted signature. In either case, if the results match, then the authenticator 104 can trust that the invitation 500 was actually issued by the inviter 102 identified in field 506. This follows because no party other than the inviter 102 knows the private encryption key that corresponds to the inviter 102's public encryption key and, therefore, no other party could have created a signature 514 that verifies correctly when decrypted with the inviter 102's public encryption key. If the signature 514 cannot be verified, then the authenticator 104 discards the invitation 500 and takes no further action on it.

Knowing that it has a valid invitation 500, the authenticator 104 proceeds, in steps 600 through 608 of FIG. 6, to challenge the identity of the invitee 106, that is to say, to determine whether the party calling itself the invitee 106 is actually the same party for which the inviter 102 issued the present invitation 500. The authenticator 104 begins in step 600 by creating a random second private encryption key. The corresponding second public encryption key follows from the well known equation:

$$PublicKey_2 = g^{PrivateKey_2} \bmod p$$

where
PrivateKey$_2$ is the randomly generated second private encryption key,
PublicKey$_2$ is the second public encryption key that corresponds to the second private encryption key PrivateKey$_2$,
p is the same large prime number used by the inviter 102 in equation 1 above, and
g is the same generator for the large prime number p used by the inviter 102 in equation 2 above.

In step 602, the authenticator 104 applies DH theory to the first public encryption key (included as field 502 in the invitation 500) and the second private encryption key generated in step 600 to create a shared challenge encryption key. The equation is:

$$ChallengeKey = PublicKey_1^{PrivateKey_2} \bmod p \quad (equation\ 3)$$

where
ChallengeKey is the shared challenge encryption key,
PublicKey$_1$ is the first public encryption key from field 502 of the invitation 500,
PrivateKey$_2$ is the second private encryption key randomly generated in step 600 of FIG. 6, and
p is the same large prime number used by the inviter 102 in equation 1 above.

The authenticator 104 proceeds to generate a challenge value and an expected challenge response value. The challenge value and the expected challenge response value are linked together by an implementation-dependent operation involving the shared challenge encryption key. That is, a device can only derive the expected challenge response value from the challenge value if that device also knows the shared challenge encryption key. Any of a number of operations are possible. In a first embodiment, shown in FIG. 6, the authenticator 104 in step 604 generates a random value and assigns it to the expected challenge response value. Optionally, the authenticator 104 logically combines (e.g., by using a bitwise exclusive OR function) the random value with specificity information such as a hash of the identities of the ad hoc group 100, authenticator 104, and invitee 106. Then in step 606, the authenticator 104 creates the challenge value by encrypting the random value, as logically combined with whatever specificity information the authenticator 104 chooses to use, using the shared challenge encryption key generated in step 602 and a cipher. Upon reception of the challenge, a legitimate invitee 106, having recreated the shared challenge encryption key, can use that key to decrypt the challenge value and return the decrypted value to the authenticator 104 (after removing specificity information, if present). (See the discussion of FIG. 8 for details.) When the authenticator 104 sees that the decrypted value received from the invitee 106 matches its own expected challenge response value, it admits the invitee 106 into the ad hoc group 100 (step 316 of FIG. 3b).

In a second embodiment of the challenge/response linking operation, the challenge value is the random number generated by the authenticator 104 in step 604, optionally combined with specificity information. The expected challenge response value is then this challenge value encrypted using the shared challenge encryption key. As in the first embodiment, only a device that can recreate the shared challenge encryption key can correctly derive the expected challenge response value from the challenge value.

As a further step that may optionally be combined with any challenge/response linking operation, the invitee 106, after performing the operation on the challenge value, hashes the result before sending it in the challenge response to the authenticator 104. Of course, the authenticator 104's expected challenge response value is then a hash of what it would otherwise have been.

Figure 7:
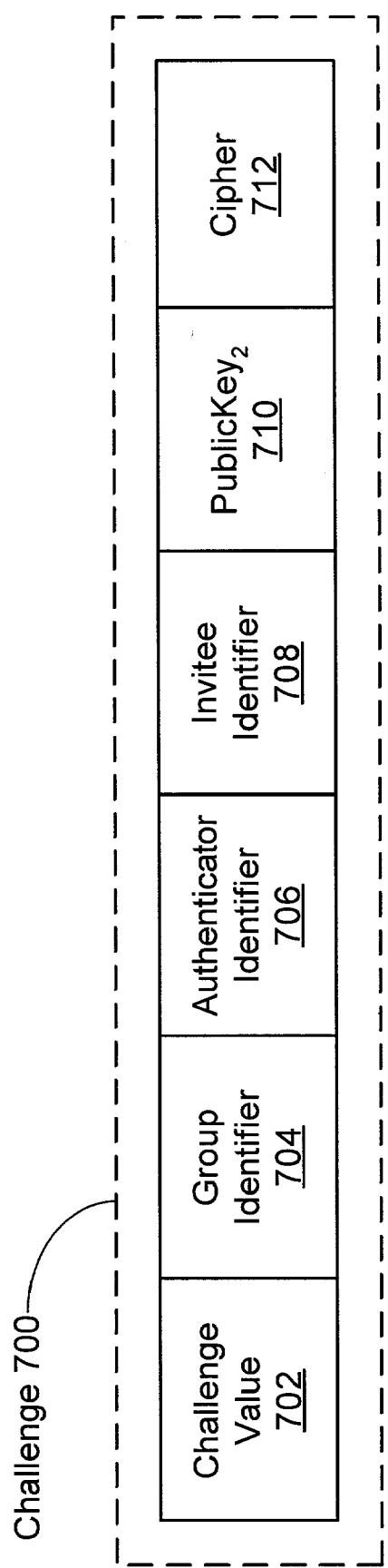
FIG. 7 is a data structure diagram showing the contents of an exemplary challenge according to one aspect of the present invention.

In step 608, the authenticator 104 packages various challenge-related information to create a challenge such as the exemplary challenge 700 of FIG. 7. The challenge 700 includes the challenge value in field 702 and the specificity information in fields 704 (ad hoc group 100 identifier), 706 (authenticator 104 identifier), and 708 (invitee 106 identifier). This specificity information may be used by the invitee 106 to check the validity of the challenge 700 (see the discussion accompanying steps 800 and 808 of FIG. 8). The second public encryption key, generated in step 600, is included in field 710, and the cipher used in the encryption of step 606 is in field 712. (Embodiments other than the one illustrated in FIG. 6 may not need the cipher field 712.)

In step 310, the authenticator 104 publishes the challenge 700 so that the invitee 106 can access it. Note that, as discussed above with respect to the invitation 500, this challenge 700 is a logical entity and need not be published in the form shown in FIG. 7.

The flow chart of FIG. 8 provides further details into the invitee 106's work in responding to the challenge 700. The invitee 106, in step 800, may be able to test the validity of the challenge. If specificity information (fields 704 through 708) is associated with the challenge 700, the invitee 106 checks the correctness of this information and ignores the challenge 700 if anything is inappropriate. This is important to prevent man-in-the-middle attacks, in which a malicious device intercepts the challenge 700, alters some of its fields, and then sends the altered challenge on to the invitee 106.

With a valid challenge 700 in hand, the invitee 106 proceeds in step 802 to recreate the first private encryption key. This was originally created by the inviter 102 in steps 400 and 402 of FIG. 4. The first private encryption key is created by applying equation 1 above to the output of the determinative function $f(\ )$. The inputs to the function $f(\ )$ include the secret password shared between the inviter 102 and the invitee 106 and may include specificity information (e.g., fields 504 through 508 of the invitation 500) and liveness information (e.g., field 510 of the invitation 500). The invitee 106 can apply equation 1 because (1) the shared secret password is known to the invitee 106, (2) the specificity and liveness information, if used, can be gathered from the invitation 500, (3) the function $f(\ )$ can be gathered from the invitation 500 or is publicly known, and (4) the large prime number p is publicly known. Note that all of this information is also available to the eavesdropper 108 with the exception of the shared secret password. This secret password is what prevents any party except the invitee 106 (more precisely, except the invitee 106 and the inviter 102) from correctly responding to the challenge 700.

In step 804, the invitee 106 uses the first private encryption key that it just recreated to recreate the shared challenge encryption key, originally created by the authenticator 104 in step 602 of FIG. 6. The DH theory of shared encryption keys provides that:

$$\text{ChallengeKey} = \text{PublicKey}_1^{PrivateKey_2} \text{ modulo } p = \text{PublicKey}_2^{PrivateKey_1} \text{ modulo } p \quad \text{(equation 4)}$$

where

ChallengeKey is the shared challenge encryption key, $PublicKey_1$ is the first public encryption key from field 502 of the invitation 500, $PrivateKey_2$ is the second private encryption key randomly generated by the authenticator 104 in step 600 of FIG. 6, p is the same large prime number used by the inviter 102 in equation 1 above, $PublicKey_2$ is the second public encryption key from field 710 of the challenge 700, and $PrivateKey_1$ is the first private encryption key, recreated by the invitee 106 in step 802 of FIG. 8.

Equation 4 gives two methods for creating the shared challenge encryption key. The first method is identical to equation 3 above and is the method used by the authenticator 104 to create the shared challenge encryption key in step 602 of FIG. 6. The invitee 106 cannot use this method, however, as it has no access to, and cannot recreate, the second private encryption key. The invitee 106 does have all the information needed to apply the second method in equation 4. It does so and thereby recreates the shared challenge encryption key.

The invitee 106, in steps 806 and 808, using the recreated shared challenge encryption key, applies the challenge/response linking operation appropriate to the current implementation. In the embodiment shown in FIG. 8 (which could be used with the embodiment of the authenticator 104 illustrated in FIG. 6), the invitee 106 decrypts the challenge value contained in field 702 of the challenge 700 by using the recreated shared challenge encryption key and the cipher contained in field 712 of the challenge 700. If the authenticator 104 logically combined specificity information with the random expected challenge response value in step 604 of FIG. 6, then the invitee 106 removes this specificity information in step 808. Note that this is a second aspect of using the specificity information to prevent man-in-the-middle attacks. If a malicious device altered the values in the specificity fields of the challenge 700, then the invitee 106 will create an invalid challenge response value when it removes the altered specificity information in step 808. This protects the ad hoc group 100 from admitting the invitee 106 based on an altered challenge 700. If, instead, the challenge 700 was not altered, then the result of step 808 is the original value randomly generated by the authenticator 104 in step 604.

In a second embodiment of the challenge/response linking operation, the invitee 106 optionally adds specificity information to the received challenge value and encrypts the result with the recreated shared challenge response key and a cipher.

As mentioned above, after applying the challenge/response linking operation, the invitee 106 may hash the result before sending it in a challenge response to the authenticator 104. The particular challenge/response linking operation to use and the options that accompany its use are known in advance to the authenticator 104 and to the invitee 106, most likely as implementation choices.

The final steps are discussed above in relation to FIG. 3b. In step 314, the invitee 106 sends the challenge response value (and, in the second embodiment mentioned above, the cipher used in encrypting the challenge response value) back to the authenticator 104. In step 316, the authenticator 104 compares the challenge value returned by the invitee 106 with the value it expects. If they match, then the authenticator 104 trusts that this invitee 106 must be the one for which the inviter 102 issued the invitation 500. The authenticator 104 admits the invitee 106 to the ad hoc group 100. If necessary, the authenticator 104 uses known techniques in step 318 to authenticate itself to the invitee 106.

Even though the eavesdropper 108 may have access to the invitation 500 and to the challenge 700, it does not know the secret password shared between the inviter 102 and the invitee 106. Therefore, the eavesdropper 108 cannot correctly recreate the shared challenge encryption key and cannot correctly respond to the challenge 700.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and in detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

I claim:

1. In a computing environment with an ad hoc group, an inviter computing device and an authenticator computing device being members of the group, an invitee computing device not being a member of the group, in which the inviter shares a secret password with the invitee, a method for the inviter to issue an invitation for the invitee to join the group, the method comprising:

generating a first private encryption key based upon the secret shared password;

generating a first public encryption key associated with the first private encryption key;

creating an invitation containing the first public encryption key;

signing the invitation using a private encryption key of the inviter; and making the invitation accessible to the invitee and to the authenticator.

2. The method of claim 1 wherein generating a first private encryption key comprises running a determinative function and passing the shared secret password as input to the determinative function.

3. The method of claim 2 wherein generating a first private encryption key further comprises passing as further input to the determinative function information selected from the group consisting of: identifier of the ad hoc group, identifier of the inviter, identifier of the invitee, timestamp, and invitation validity period.

4. The method of claim 3 wherein the invitation further contains the further input passed to the determinative function.

5. The method of claim 2 wherein running a determinative function comprises applying a cryptographic hash to the shared secret password.

6. The method of claim 2 wherein generating a first private encryption key further comprises assigning an output of the determinative function modulo a prime number to the first private encryption key.

7. The method of claim 6 wherein generating a first public encryption key comprises assigning a generator for the prime number raised to a power of the first private encryption key, modulo the prime number, to the first public encryption key.

8. The method of claim 7 wherein the invitation further contains the prime number and the generator.

9. The method of claim 1 wherein generating a first public encryption key associated with the first private encryption key comprises generating a first public encryption key so that a value encrypted using one of these two keys can be decrypted using the other.

10. The method of claim 1 wherein signing comprises taking a hash of the contents of the invitation and encrypting the hash using the private encryption key of the inviter.

11. The method of claim 1 wherein making the invitation accessible comprises using a technique selected from the group consisting of: sending a message containing the invitation, posting the invitation in a place accessible to the inviter and to the authenticator, and fixing values of some of the contents of the invitation before creating the invitation.

12. A computer-readable medium containing instructions for performing a method for an inviter computing device to issue an invitation for an invitee computing device to join an ad hoc group, the inviter and an authenticator computing device being members of the group, the invitee not being a member of the group, in which the inviter shares a secret password with the invitee, the method comprising:

generating a first private encryption key based upon the secret shared password;

generating a first public encryption key associated with the first private encryption key;

creating an invitation containing the first public encryption key;

signing the invitation using a private encryption key of the inviter; and making the invitation accessible to the invitee and to the authenticator.

13. In a computing environment with an ad hoc group, an inviter computing device and an authenticator computing device being members of the group, an invitee computing device not being a member of the group, the inviter having issued an invitation to the invitee to join the group, a method for the authenticator to issue an authentication challenge to the invitee, the method comprising:

accessing the invitation;

checking the invitation for validity; and if the invitation is valid, then generating a second private encryption key;

generating a second public encryption key associated with the second private encryption key;

generating a shared challenge encryption key from a first public encryption key contained in the invitation and the second private encryption key;

generating a challenge value;

creating an authentication challenge containing the challenge value and the second public encryption key; and making the authentication challenge accessible to the invitee.

14. The method of claim 13 wherein accessing the invitation comprises using a technique selected from the group consisting of: receiving a message containing the invitation and accessing the invitation in a place accessible to the inviter and to the authenticator.

15. The method of claim 13 wherein checking the invitation for validity comprises checking information contained in the invitation, the information selected from the group consisting of: identifier of the ad hoc group, identifier of the inviter, identifier of the invitee, timestamp, and invitation validity period.

16. The method of claim 13 wherein checking the invitation for validity comprises decrypting a signature of the invitation using a public encryption key of the inviter, taking a hash of the contents of the invitation, and comparing the hash to the decrypted signature.

17. The method of claim 13 wherein generating a second private encryption key comprises assigning a randomly generated number to the second private encryption key.

18. The method of claim 13 wherein generating a second public encryption key comprises assigning a generator for a prime number raised to a power of the second private encryption key, modulo the prime number, to the second public encryption key.

19. The method of claim 18 wherein generating a shared challenge encryption key comprises assigning the first public encryption key raised to a power of the second private encryption key, modulo the prime number, to the shared challenge encryption key.

20. The method of claim 13 wherein generating a second public encryption key associated with the second private encryption key comprises generating a second public encryption key so that a value encrypted using one of these two keys can be decrypted using the other.

21. The method of claim 13 wherein generating a challenge value comprises generating a random number.

22. The method of claim 21 wherein generating a challenge value further comprises:

encrypting the random number using the shared challenge encryption key and a cipher;

and assigning the encrypted random number to the challenge value; and wherein the authentication challenge further contains the cipher.

23. The method of claim 21 wherein generating a challenge value further comprises combining the random number with a hash of specificity information, the specificity information selected from the group consisting of: identifier of the ad hoc group, identifier of the authenticator, and identifier of the invitee.

24. The method of claim 23 wherein generating a challenge value further comprises:
encrypting the combined random number and hash of specificity information using the shared challenge encryption key and a cipher; and
assigning the encrypted random number and hash of specificity information to the challenge value;
and wherein the authentication challenge further contains the cipher.

25. The method of claim 13 wherein making the authentication challenge accessible comprises using a technique selected from the group consisting of: sending a message containing the authentication challenge, posting the authentication challenge in a place accessible to the authenticator and to the invitee, and fixing values of some of the contents of the authentication challenge before creating the authentication challenge.

26. A computer-readable medium containing instructions for performing a method for an authenticator computing device to issue an authentication challenge to an invitee computing device, an inviter computing device and the authenticator being members of an ad hoc group, the invitee not being a member of the group, the inviter having issued an invitation to the invitee to join the group, the method comprising:
accessing the invitation;
checking the invitation for validity; and
if the invitation is valid, then
generating a second private encryption key;
generating a second public encryption key associated with the second private encryption key;
generating a shared challenge encryption key from a first public encryption key contained in the invitation and the second private encryption key;
generating a challenge value;
creating an authentication challenge containing the challenge value and the second public encryption key; and
making the authentication challenge accessible to the invitee.

27. In a computing environment with an ad hoc group, an inviter computing device and an authenticator computing device being members of the group, an invitee computing device not being a member of the group, in which the inviter shares a secret password with the invitee, the inviter having issued an invitation to the invitee to join the group, the authenticator having issued an authentication challenge to the invitee, a method for the invitee to issue a response to the authentication challenge, the method comprising:
accessing the authentication challenge;
generating a first private encryption key based upon the secret shared password;
generating a shared challenge encryption key based upon the generated first private encryption key and upon a second public encryption key contained in the authentication challenge;
generating a challenge response value based upon a challenge value contained in the authentication challenge;
creating an authentication challenge response containing the challenge response value; and
making the authentication challenge response accessible to the authenticator.

28. The method of claim 27 wherein accessing the authentication challenge comprises using a technique selected from the group consisting of: receiving a message containing the authentication challenge and accessing the authentication challenge in a place accessible to the authenticator and to the invitee.

29. The method of claim 27 wherein generating a first private encryption key comprises running a determinative function and passing the shared secret password as input to the determinative function.

30. The method of claim 29 further comprising accessing the invitation and wherein generating a first private encryption key further comprises passing as further input to the determinative function information contained in the invitation, the information selected from the group consisting of: identifier of the ad hoc group, identifier of the inviter, identifier of the invitee, timestamp, and invitation validity period.

31. The method of claim 29 wherein running a determinative function comprises applying a cryptographic hash to the shared secret password.

32. The method of claim 29 wherein generating a first private encryption key further comprises assigning an output of the determinative function modulo a prime number to the first private encryption key.

33. The method of claim 27 wherein generating a shared challenge encryption key comprises assigning the second public encryption key raised to a power of the generated first private encryption key, modulo a prime number, to the shared challenge encryption key.

34. The method of claim 27 wherein generating a challenge response value comprises encrypting the challenge value using the shared challenge encryption key and a cipher; and wherein the authentication challenge response further contains the cipher.

35. The method of claim 34 wherein generating a challenge response value further comprises assigning a hash of the encrypted challenge value to the challenge response value.

36. The method of claim 27 wherein generating a challenge response value comprises combining the challenge value with a hash of specificity information, the specificity information selected from the group consisting of: identifier of the ad hoc group, identifier of the authenticator, and identifier of the invitee.

37. The method of claim 36 wherein generating a challenge response value further comprises encrypting the combined challenge value and hash of specificity information using the shared challenge encryption key and a cipher; and wherein the authentication challenge response further contains the cipher.

38. The method of claim 37 wherein generating a challenge response value further comprises assigning a hash of the encrypted combined challenge value and hash of specificity information to the challenge response value.

39. The method of claim 27 wherein generating a challenge response value comprises decrypting the challenge value using the shared challenge encryption key and a cipher contained in the authentication challenge.

40. The method of claim 39 wherein generating a challenge response value further comprises assigning a hash of the decrypted challenge value to the challenge response value.

41. The method of claim 39 wherein generating a challenge response value further comprises removing from the decrypted challenge value a hash of specificity information, the specificity information selected from the group consisting of: identifier of the ad hoc group, identifier of the authenticator, and identifier of the invitee.

42. The method of claim 41 wherein generating a challenge response value further comprises assigning a hash of the decrypted challenge value with the hash of specificity information removed to the challenge response value.

43. The method of claim 27 wherein making the authentication challenge response accessible comprises using a technique selected from the group consisting of: sending a message containing the authentication challenge response and posting the authentication challenge response in a place accessible to the invitee and to the authenticator.

44. A computer-readable medium containing instructions for performing a method for an invitee computing device to issue a response to an authentication challenge, an inviter computing device and an authenticator computing device being members of an ad hoc group, the invitee not being a member of the group, in which the inviter shares a secret password with the invitee, the inviter having issued an invitation to the invitee to join the group, the authenticator having issued the authentication challenge to the invitee, the method comprising:

accessing the authentication challenge;

generating a first private encryption key based upon the secret shared password;

generating a shared challenge encryption key based upon the generated first private encryption key and upon a second public encryption key contained in the authentication challenge;

generating a challenge response value based upon a challenge value contained in the authentication challenge;

creating an authentication challenge response containing the challenge response value; and making the authentication challenge response accessible to the authenticator.

* * * * *

UNITED STATES PATENT AND TRADEMARK OFFICE
CERTIFICATE OF CORRECTION

PATENT NO. : 7,120,797 B2
APPLICATION NO. : 10/132018
DATED : October 10, 2006
INVENTOR(S) : Graham A. Wheeler It is certified that error appears in the above-identified patent and that said Letters Patent is hereby corrected as shown below:

On Title Page

Item (74), "Marshall." should be -- Marshall, --.

Signed and Sealed this

Tenth Day of April, 2007

JON W. DUDAS
*Director of the United States Patent and Trademark Office*